(12) United States Patent
Mankame et al.

(10) Patent No.: US 8,733,097 B2
(45) Date of Patent: May 27, 2014

(54) MULTI-STAGE ACTUATION FOR AN ACTIVE MATERIALS-BASED ACTUATOR

(75) Inventors: Nilesh D. Mankame, Ann Arbor, MI (US); Richard J. Skurkis, Lake Orion, MI (US); Nicholas W. Pinto, IV, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 528 days.

(21) Appl. No.: 13/048,958

(22) Filed: Mar. 16, 2011

(65) Prior Publication Data
US 2012/0239183 A1    Sep. 20, 2012

(51) Int. Cl.
*F01B 29/10*    (2006.01)
*F02G 1/04*    (2006.01)

(52) U.S. Cl.
USPC .......................................... 60/527

(58) Field of Classification Search
USPC ..................................... 60/527–529
See application file for complete search history.

(56) References Cited

U.S. PATENT DOCUMENTS

| | | | | |
|---|---|---|---|---|
| 4,716,731 A | * | 1/1988 | Sakai et al. | 60/527 |
| 5,425,075 A | * | 6/1995 | Selden et al. | 379/29.02 |
| 6,019,113 A | * | 2/2000 | Allston et al. | 137/1 |
| 6,834,835 B1 | * | 12/2004 | Knowles et al. | 244/198 |
| 7,188,473 B1 | * | 3/2007 | Asada et al. | 60/527 |
| 2006/0048511 A1 | | 3/2006 | Everson et al. | |
| 2007/0046146 A1 | | 3/2007 | Thies | |
| 2008/0034749 A1 | | 2/2008 | Ukpai | |
| 2008/0034750 A1 | | 2/2008 | Gao et al. | |
| 2008/0185541 A1 | | 8/2008 | Ukpai | |
| 2009/0277169 A1 | | 11/2009 | Usoro et al. | |

FOREIGN PATENT DOCUMENTS

DE    102004022371 A1    12/2005
DE    102004052238 A1    5/2006

* cited by examiner

*Primary Examiner* — Thomas Denion
*Assistant Examiner* — Brian Inacay
(74) *Attorney, Agent, or Firm* — Quinn Law Group, PLLC

(57) ABSTRACT

A mechanical system for selectively moving a load a motive distance comprises an actuator operable for applying a force to the load. The actuator includes an active material element having a variable property. A controller is connected to the actuator and operable for sending a first stimulus to the actuator to shift the actuator from a first state to a second state. The second state is associated with detecting the onset of actuation for the actuator. The controller is operable to send the priming stimulus level to the actuator to shift it to the primed state. The actuator includes a priming device operable for determining the onset of actuation of the first active material element.

18 Claims, 6 Drawing Sheets

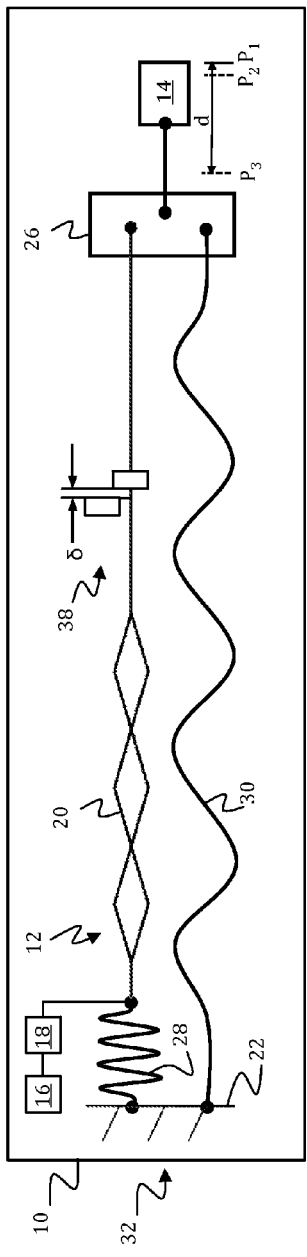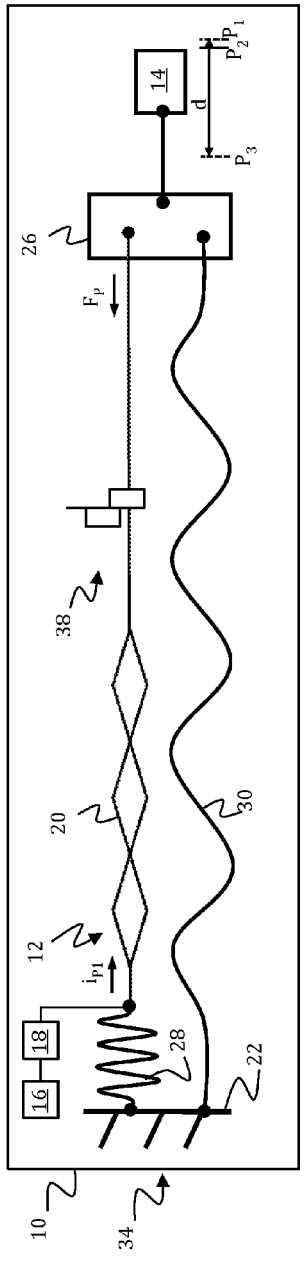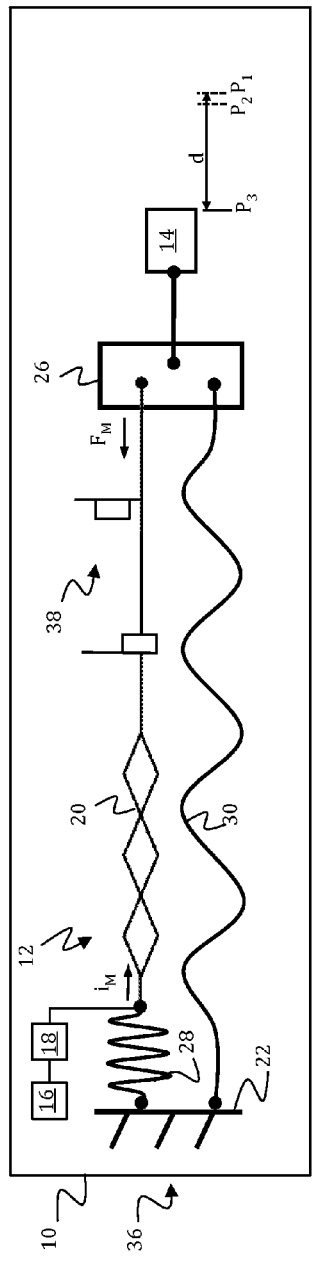

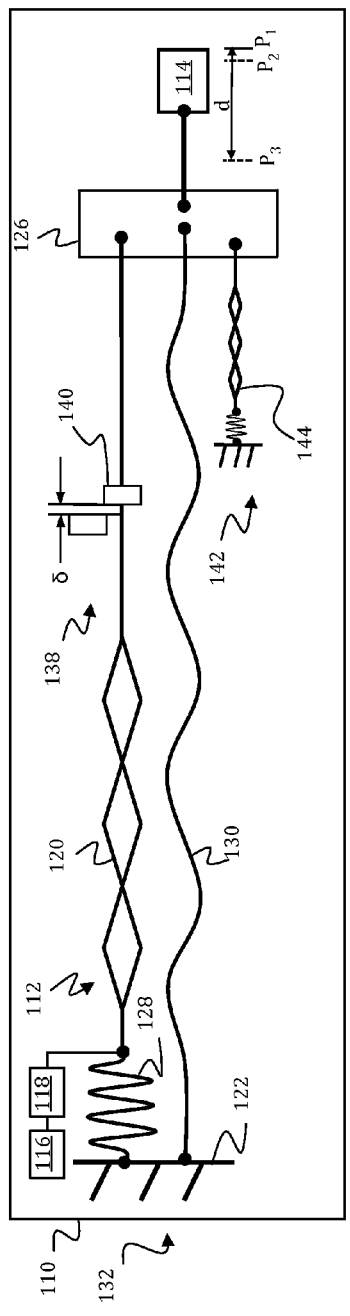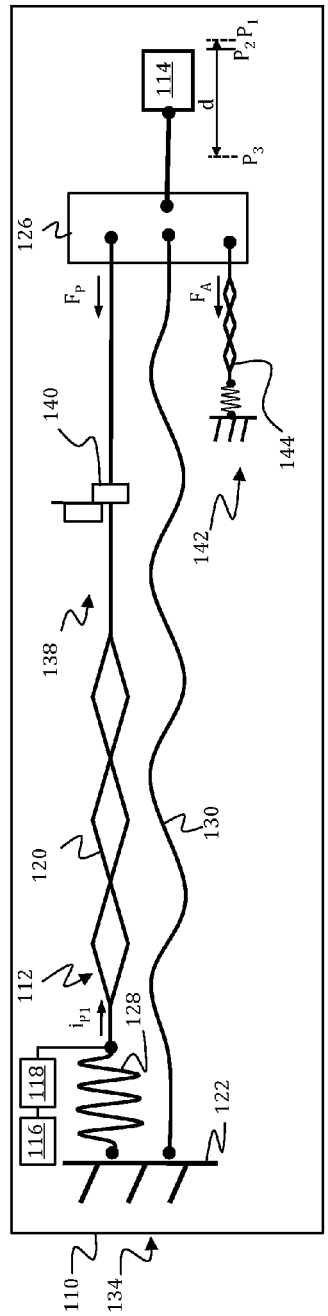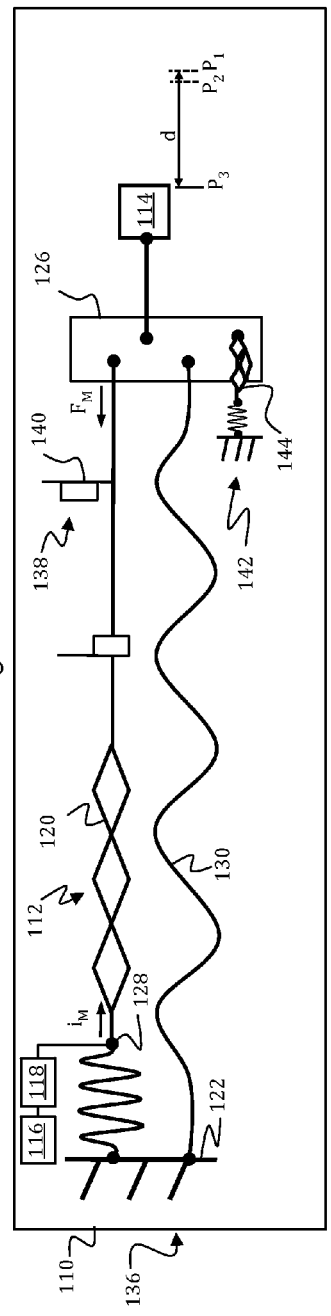

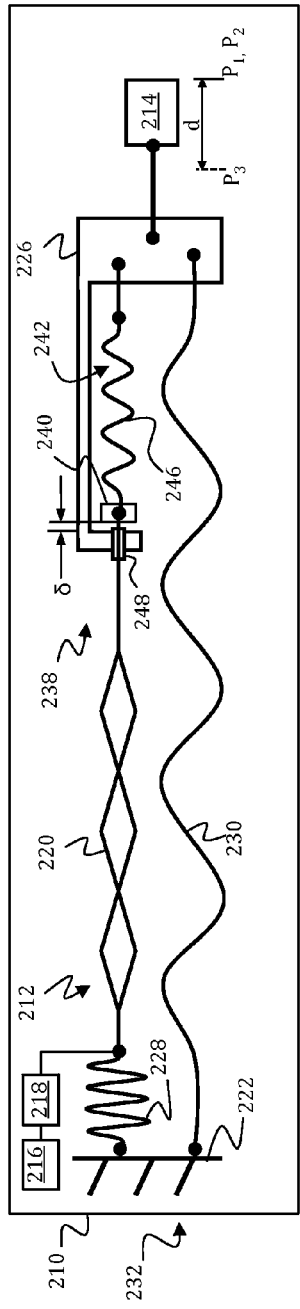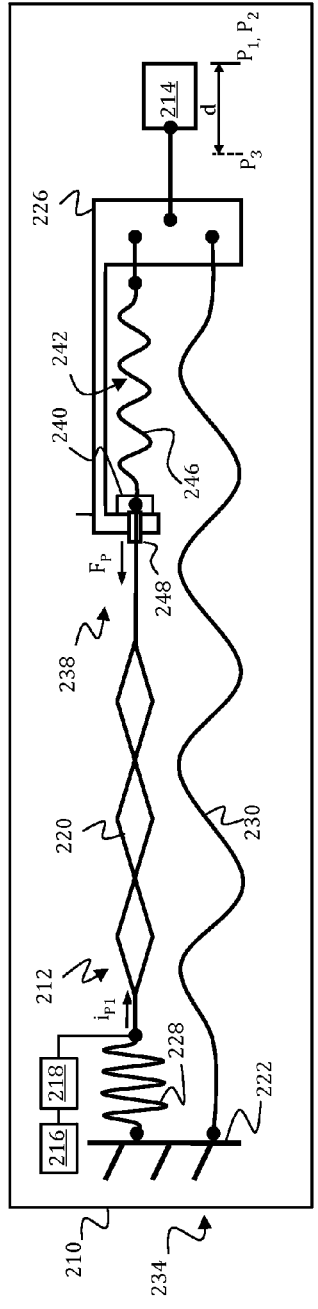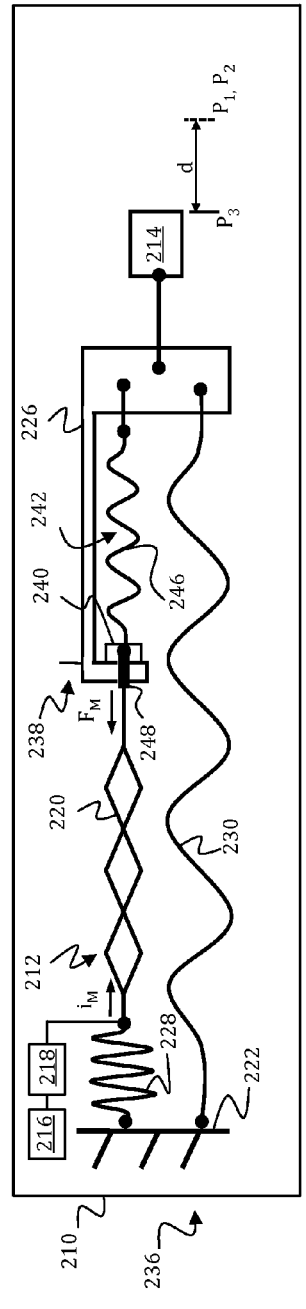

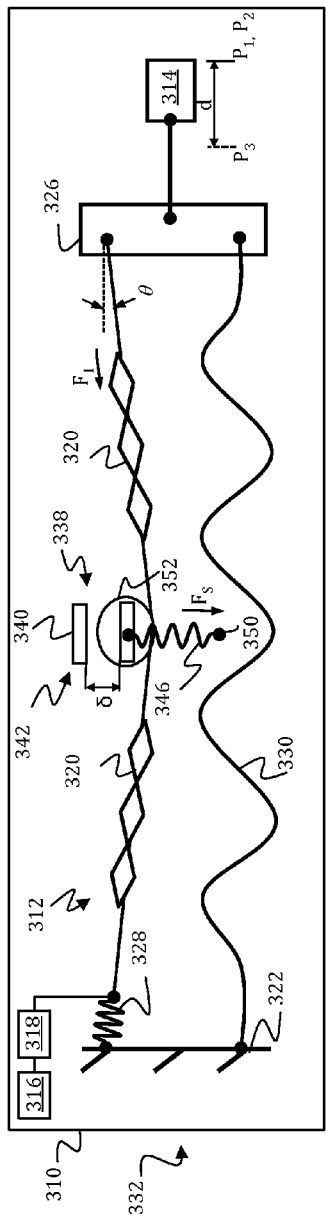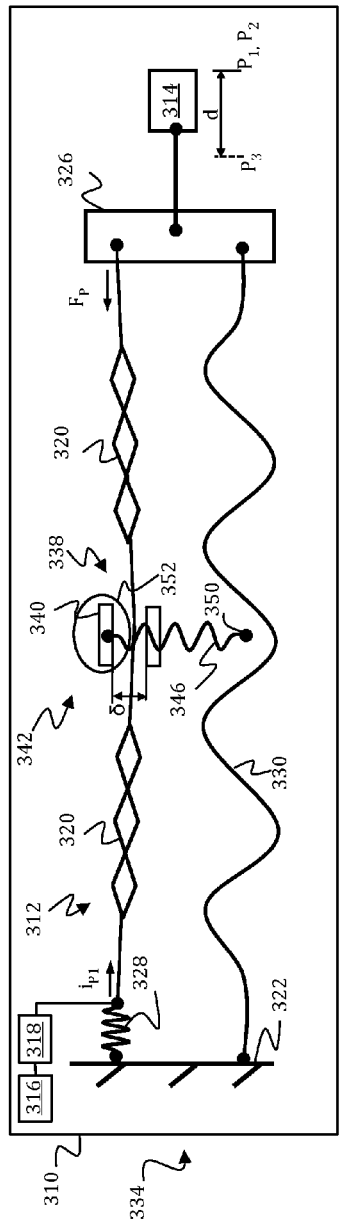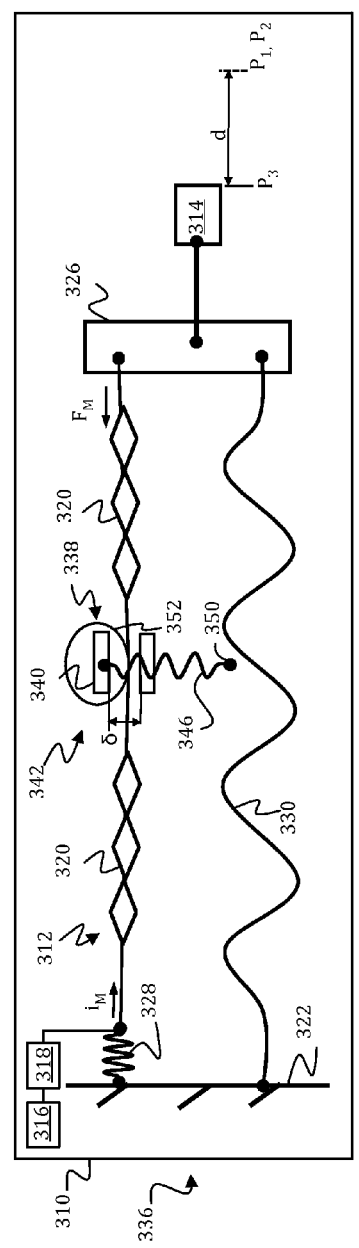

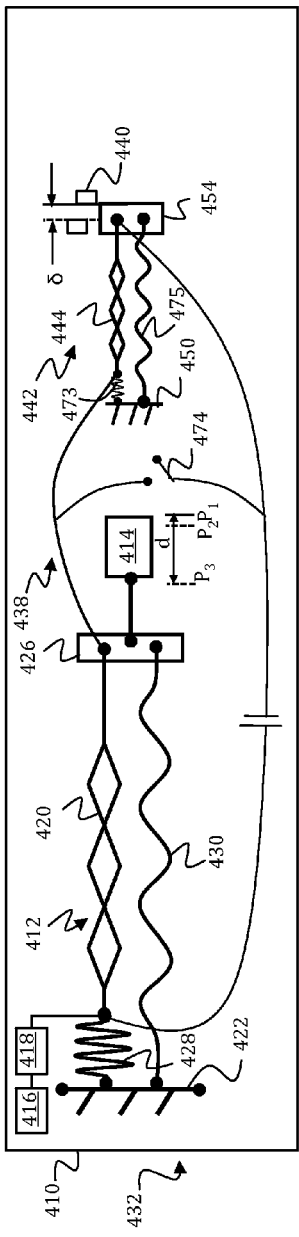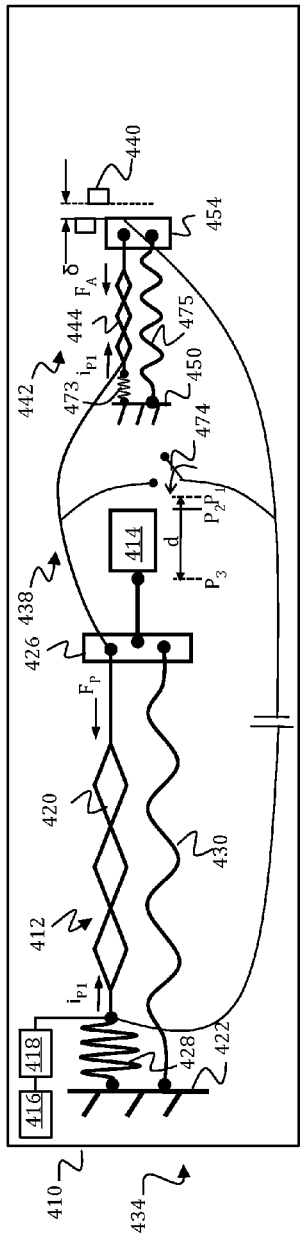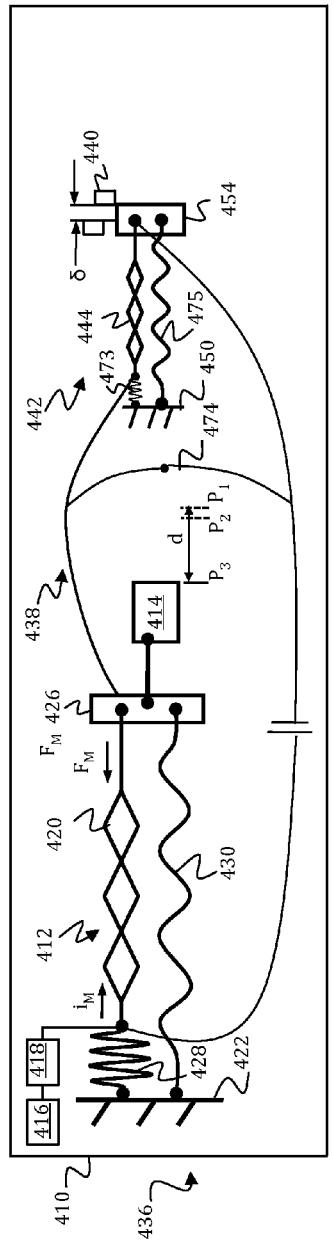

MULTI-STAGE ACTUATION FOR AN ACTIVE MATERIALS-BASED ACTUATOR

TECHNICAL FIELD

The present invention relates to actuators that have an active material element.

BACKGROUND

In a mechanical system, pressurized fluid, electricity, or another source of energy may be used to impart a motive force to a load, with the motive force being capable of moving the load over a predetermined motive distance. Various rotary or linear actuator devices or actuators can direct the motive force as needed in a precise manner within the mechanical system in order to achieve a desired end result. However, variations in environmental conditions such as temperature, as well as the physical properties or characteristics of the load, can affect the overall performance or response of a mechanical system.

Therefore, it is desirable for the system behavior to be consistent over a wide range of operating conditions including variations in temperature, age of the system, small variations in the load, etc. A key aspect of, consistent performance especially for systems with thermally activated elements, such as an SMA (shape memory alloy) actuator, is the time that the system takes to complete operation. Variations in ambient temperature, heat transfer coefficients (e.g. due to surface accumulation of grime and oxides) and even changes in the effective load due to changes in system friction, all tend to change the response time of the system.

One way to mitigate the influence of the above variations on the response time of the system is to prime, or pre-heat, the actuator. In thermally-activated SMA systems this implies, heating the SMA to a temperature that is less than the actuation temperature of the SMA. This helps reduce the variation in the system's response time by reducing the time required to sensibly heat the SMA from its starting temperature to its actuation temperature. The remaining part of heating the SMA involves supplying the enthalpy to drive the phase transformation which produces actuation of the system. This is typically faster than the sensible heating part. Moreover, the enthalpy of transformation is less sensitive to the variations in the system and its ambient conditions than the sensible heat part. Therefore, minimizing the time required for sensible heating via priming ensures a more consistent system response time regardless of the variations discussed above.

One approach to estimate the priming stimulus level includes look-up tables based on expected changes in the system. However, this does not cover situations when the system or the environment changes in manner that is not covered by the look-up tables. Another approach is using environment and feedback control systems that monitor the behavior of the system using multiple sensors. However, this results in a high cost system having increased complexity.

SUMMARY

A method for imparting a desired motion to a load in a mechanical system comprising applying a gradually increasing first stimulus to an active material element of an actuator to vary a variable property until a priming device detects the onset of actuation for the actuator. A priming stimulus level is determined based on the first stimulus at the onset of actuation of the actuator. A second stimulus is applied to the active material element of the actuator to vary the variable property until a motive force of the actuator is achieved, to thereby impart the desired motion to the load.

A mechanical system for selectively moving a load a motive distance comprises an actuator operable for applying a force to the load. The actuator includes an active material element having a variable property. A controller is connected to the actuator and operable for sending a first stimulus to the actuator to shift the actuator from a first state to a second state. The second state is associated with detecting the onset of actuation for the actuator. The controller is also operable to send the priming stimulus level to the actuator to shift it to the primed state and is operable for sending a second stimulus to the actuator to shift the actuator to a third state, such that the actuator is applying the force to the load to move the load the motive distance. The actuator includes a priming device operable for determining the onset of actuation of the first active material element.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a mechanical system having a first embodiment of an actuator, shown in an un-actuated state;

FIG. 2 is a schematic illustration of the mechanical system of FIG. 1 having the first embodiment of the actuator, shown in a primed state;

FIG. 3 is a schematic illustration of the mechanical system of FIGS. 1-2 having the first embodiment of the actuator, shown in an actuated state;

FIG. 4 is a schematic illustration of a mechanical system having a second embodiment of an actuator, shown in an un-actuated state;

FIG. 5 is a schematic illustration of the mechanical system of FIG. 4 having the second embodiment of the actuator, shown in a primed state;

FIG. 6 is a schematic illustration of the mechanical system of FIGS. 4-5 having the second embodiment of the actuator, shown in an actuated state;

FIG. 7 is a schematic illustration of a mechanical system having a third embodiment of an actuator, shown in an un-actuated state;

FIG. 8 is a schematic illustration of the mechanical system of FIG. 7 having the third embodiment of the actuator, shown in a primed state;

FIG. 9 is a schematic illustration of the mechanical system of FIGS. 7-8 having the third embodiment of the actuator, shown in an actuated state;

FIG. 10 is a schematic illustration of a mechanical system having a fourth embodiment of an actuator, shown in an un-actuated position;

FIG. 11 is a schematic of the mechanical system of FIG. 10 having the fourth embodiment of the actuator, shown in a primed state;

FIG. 12 is a schematic illustration of the mechanical system of FIGS. 10-11 having the fourth embodiment of the actuator, shown in an actuated state;

FIG. 13 is a schematic illustration of a mechanical system having a fifth embodiment of an actuator, shown in an un-actuated state;

FIG. 14 is a schematic illustration of the mechanical system of FIG. 13 having the fifth embodiment of the actuator, shown in a primed state;

FIG. 15 is a schematic illustration of the mechanical system of FIGS. 13-14 having the fifth embodiment of the actuator, shown in an actuated state.

DETAILED DESCRIPTION

Figure 16:
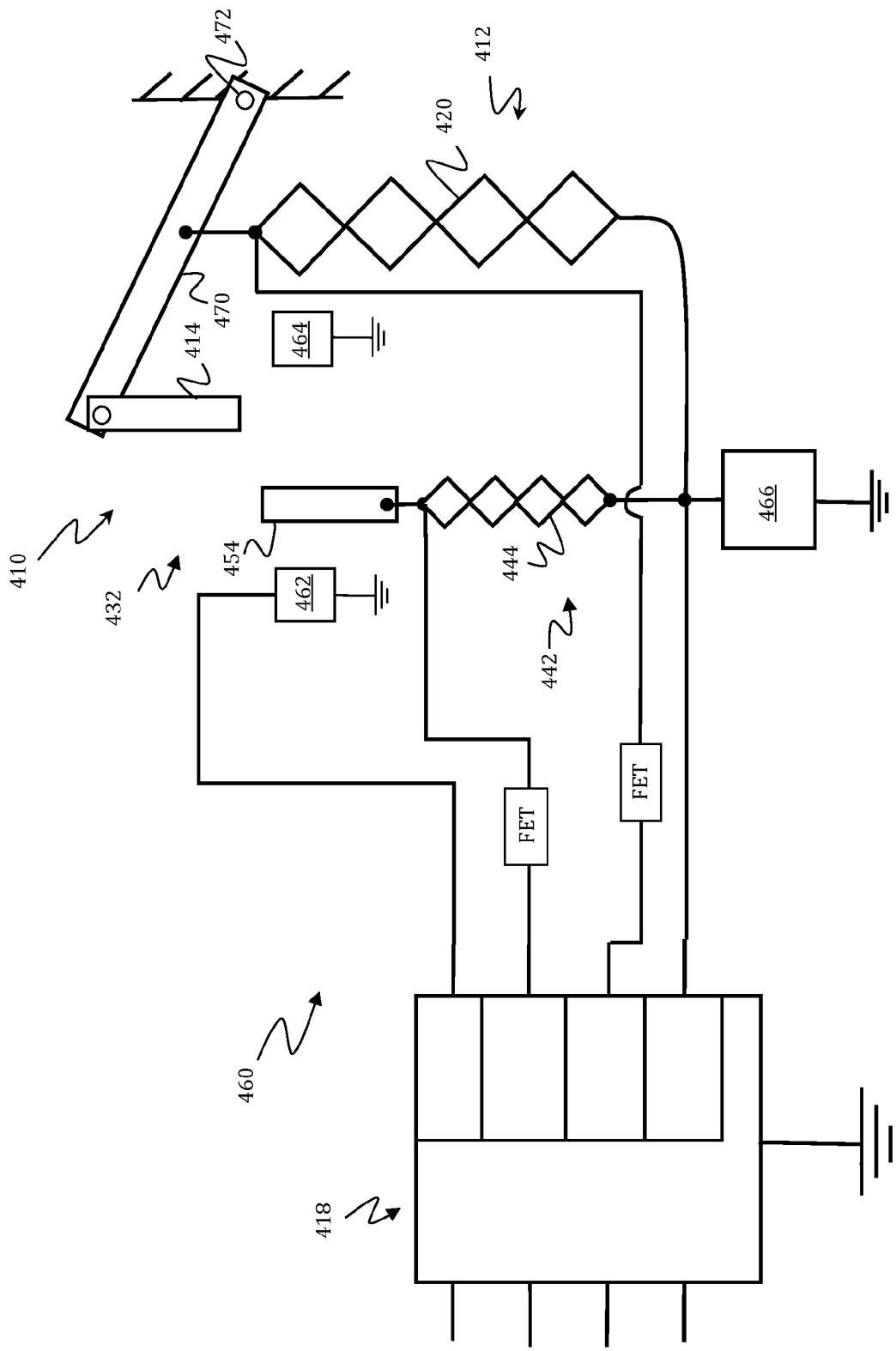
FIG. 16 is a schematic illustration of a control circuit for the mechanical system of FIGS. 13-15 for use with the fifth embodiment of the actuator, shown in the un-actuated state.

Referring to the drawings wherein like reference numbers correspond to like or similar components throughout the several figures, and beginning with FIGS. 1-3, a mechanical system 10 includes an actuator 12 coupled to a load 14. The actuator 12 applies a first or priming force $F_P$ on the load 14 and thereafter applies a second or motive force $F_M$ on the load 14.

The actuator 12 is defined herein as any device operable of exerting or applying the motive force $F_M$, to the load 14 in order to provide a motive force sufficient for imparting a desired motion to the load 14, for example to move the load 14 through a predetermined motive distance "d" in a specified time period or interval. As used herein, the term "motive force" refers to a force sufficient for producing a desired motion. The motion including but not limited to a distance traveled by the load 14, a time in which the load 14 travels and any acceleration or deceleration profile of the load 14 during that time. The actuator 12 can be configured as a rotary actuator or as a linear actuator, in order to provide the desired direction to the movement of the load 14, as will be described below. The motive force $F_M$ is a variable force sufficient for moving the load 14 over the required distance d. The actuator 12 includes an active material element 20. The active material element 20 is constructed at least partially of an active material such as a resistively heated, thermally actuated shape memory alloy (SMA). The actuator 12 can be selectively activated or energized by a controller 18 to provide a suitable motive force $F_M$. As used herein, the term "suitable" refers to a determination of one or more of relative efficiency, response speed, stroke, force, or other criteria of the actuator 12.

Minimizing the time required for sensible heating via priming ensures a more consistent system response time regardless of the variations in the system and environmental conditions as discussed earlier. Therefore, it is important to accurately and robustly determine the stimulus level (i.e. the magnitude of the heating current for the thermally-activated SMA elements 20) that will prime the actuator 12 without producing significant motion of the load 14. The embodiments described herein, determine the priming stimulus level without using expensive sensors and signal processing or relying on fixed look-up tables. Determining the priming stimulus level is done by using a two-stage actuation method, wherein the first stage serves to determine the priming stimulus level for the current state of the system 10 and the environment without producing a significant movement of the load 14, while the second stage serves to move the load 14 through the desired motion.

Shape memory alloys (SMA), which are sometimes referred to in the art informally as "smart materials", are materials or compositions exhibiting pseudo-elasticity and shape memory, and thus have the ability to "remember" their original shape. The original shape may be recalled subsequent to a deformation that changes its shape by applying an external stimulus (i.e., an activation signal). As such, deformation of the shape memory material from the original shape can be a temporary and reversible condition. These capabilities are due, in part, to a temperature and stress-dependent solid-state change of phase due to a cooperative atomic rearrangement. The two phases, i.e. the Martensite (m) phase and the Austenite (a) phase, refer to the lower and higher temperature phases, respectively, in which the phase transformation occurs from a low-symmetry (Martensite) to a highly symmetric (Austenite) crystallographic structure. SMAs represent a class of thermally-activated smart materials (TASM) that undergo a reversible phase transformation responsible for stress-induced and temperature-induced recoverable deformation behavior.

Accordingly, the actuator 12 of FIGS. 1-3 may be constructed partially or fully of an SMA element 20 whose length or stiffness varies actively in response to its temperature and the applied load. Its temperature can be modulated by resistively heating it by passing an electrical current through the SMA element 20 from the energy source 16. The active material element 20 may be constructed entirely of an SMA wire or coil that remains in a partially or fully de-twinned martensitic (m) phase when the mechanical system 10 is in the first un-actuated position $P_1$ as shown in FIG. 1, unless and until the active material element 20 is heated above a characteristic temperature. When the active material element 20 is heated to a temperature exceeding the characteristic temperature, a solid-state transformation occurs, and the active material element 20 enters the austenite phase or a-phase. Heating of the active material element 20 may be achieved by Joule, radiation, convection, or other suitable heating methods. The disclosed embodiments describe resistively heated, thermally activated SMA. However, other materials and means of actuating the materials may be used.

In the embodiment shown, the active material element 20 is a shape memory alloy (SMA) that is fastened or connected to a stationary member 22 and to a coupler 26 at opposing ends. The coupler 26 can be a simple lever or a more complex transmission designed to ensure a sufficient amount of amplification of force, motion, and/or frequency of the actuator 12 when the actuator 12 is activated or stimulated. Whatever the embodiment, the actuator 12 is coupled to the load 14 through the coupler 26, and activated as needed to move the load 14 through the motive distanced in a prescribed manner.

An overload element 28 may be connected between the active material element 20 and the stationary member 22 to protect the active material element 20 from any overloading that may occur during actuation of the actuator 12. Additionally, a biasing element 30 may be fastened or connected to the stationary member 22 and to the coupler 26 in a parallel arrangement with the active material element 20. The biasing element 30 may apply a biasing force on the active material element 20, coupler 26 and load 14 to ensure the load 14 returns to a first position $P_1$ when the actuator 12 is shifted from an actuated state 36 (illustrated in FIG. 3) or a primed state (not shown) back to an un-actuated state 32 (illustrated in FIG. 1). Additionally, the force from the biasing element 30 may also assist in returning the active material element 20 to the original state or length when the actuator 12 is shifted from the actuated state 36 or primed state back to the un-actuated state 32.

In some cases, the external load 14, itself, may assist the system to return to its un-actuated configuration when the SMA element 20 is de-activated. In this instance, the load 14 also provides the force that causes/assists the actuator 12 to return to its original state or length when the actuator is de-activated. Examples of such loads include conservative force fields created by gravity (i.e. dead weight loads), elasticity (e.g. springs), etc. A biasing element 30 is not needed in these cases.

In the embodiment shown in FIGS. 1-3, the actuator 12 is configured to operate over a wide range of temperatures and to adjust for changing conditions of the mechanical system 10 and the actuator 12. For example, when the mechanical system 10 is located in a vehicle, the temperature may vary greatly due to different environments and seasons. The actuator 12 must be able to operate in all conditions at a fairly consistent rate of response. However, in cold temperatures, it may take longer for the active material element 20 to reach the characteristic temperature at which phase transformation occurs, thus, slowing the response rate of the actuator 12. Additionally, other conditions of the mechanical system 10 and actuator 12 may also change the performance speed of the active material element 20 over time. For example, the response time of the active material element 20 may be effected by dust or wear on the element 20.

In order to accommodate the changing conditions, the actuator 12 is operated in multiple stages. To begin, the actuator 12 is shifted from the first or un-actuated state 32 (shown in FIG. 1) to a second state 34 (shown in FIG. 2). The second state 34 is associated with estimation of the priming stimulus level or the onset of movement of the actuator 12. Notice the movement of a priming device 38 which detects the onset of movement of the load and is described in greater detail below. The controller 18 generates a first activation signal based upon predetermined conditions of the mechanical system 10, such as start of operation of the mechanical system 10. The activation signal for resistively heated SMA actuators is the electric current passed through the SMA element. When the actuator 12 is in the first or un-actuated state 32, the load 14 is located in the first position $P_1$. Thereafter, the controller 18 applies a gradually increasing first stimulus to the actuator 12 until the system configuration 34 illustrated in FIG. 2 is reached. The current at which this happens is a first estimate of the priming current ($i_{P1}$). The first estimate of the priming current $i_{P1}$ causes the actuator 12 to move from the un-actuated state 32 to the second state 34. When the actuator 12 is in the second state 34 the position of the load 14 is in the second position $P_2$. The second state 34 is associated with the onset of activation in the active material 20. In this case, the motion of the load 14 is detected to infer activation of the active material 20 as the active material 20 is directly connected to the load 14. In some instances, the small motion 6 of the load in the state 34 is acceptable and we treat $i_{P1}$ as the priming current $i_P$ and the second state 34 as the primed state.

Alternatively, for some embodiments of the actuator 12 even small deflections δ of the load 14 are not acceptable prior to the full-activation of the actuator 12. In this instance, the priming current $i_P=\alpha i_{P1}$, wherein a can be any value [0.1, 1]. Therefore, the primed state (not shown) of the system 10, which is indicated by the priming current $i_P$ applied to the SMA element 20 may be intermediate in appearance to the un-actuated or first state 32 and the second state 34.

As discussed above, most of the variation that may occur in the actuation time of the active material element 20 will occur when moving the actuator 12 from the un-actuated state 32 to the primed state. Thereafter, the controller 18 generates a second activation signal. Upon generating the second activation signal, the controller 18 thereby applies a second stimulus of a magnitude ($i_M$) appropriate to achieve the prescribed motion of the load 14, e.g. moving it through the distance 'd' as shown in FIG. 3. The motive current $i_M$ moves the actuator 12 from the second state 34 to the third or actuated state 36 (shown in FIG. 3), which actuates movement of the load 14 to a third position $P_3$. The third position $P_3$ corresponds to the total predetermined motive distance d that the load 14 is required to move.

When the actuator 12 is in the second state 34 the first force $F_P$ is acting on the load 14. The amount of force acting on the load 14 corresponds to the amount of stimulus provided to the active material element 20. That is, for a known active material element 20 the amount of force generated by the active material element 20 can be determined based upon the stimulus input into the active material element 20. In the embodiment shown, the first force $F_P$ and the second or motive force $F_M$ correspond to the level of first stimulus and the second stimulus, i.e. current, supplied to the active material element 20 from the controller 18. Therefore, the active material element 20 exerts a first force $F_P$ on the load 14 when the first estimate of the priming current $i_{P1}$, i.e. first stimulus, is applied to the active material element 20 and the active material element 20 exerts a motive force $F_M$ on the load 14 when the motive current $i_M$, i.e. second stimulus, is applied to the active material element 20.

In the embodiment shown in FIG. 2, the priming distance δ corresponds to the difference between the first position $P_1$ and the second position $P_2$. When the current supplied to the active material element 20 attains the value of the first estimate of the priming current $i_{P1}$ the actuator 12 moves the load 14 through the priming distance δ and places it in the priming position $P_2$. The priming distance δ is preferably a minimal fraction of the total motion 'd' at the load 14 in the actuated state 36. The priming distance δ must be significant enough to be measured by some motion sensor even in the presence of external disturbances such as vibrations, temperature variations, etc but no bigger than this. In one embodiment the priming distance is 5-20% of the total deflection of the active material element 20 to move the load 14. As small margin of error for deflection of the active material element 20 may be allowed to compensate for motions occurring external to the operation of the actuator 12, e.g. vibrations of the mechanical device 10 causing minute deflections of the active material actuator 20

The system 10 stays in the primed state as long as the priming current $i_P$ is maintained through the actuator 12. The system 10 is typically maintained in the primed state until the second activation signal (described below) is received, the operation is aborted, or a prescribed interval of time has elapsed since the system 10 was primed without any of the preceding two events occurring. In the later cases, the system 10 reverts back to its un-actuated state 32. The actuator 12 may then be periodically re-primed to ensure consistent actuation of the mechanical system 10 while providing an economical utilization of the energy source 16.

Approximating the priming current $i_P$ as described above, where the priming current $i_P=\alpha i_{P1}$, wherein a can be any value [0.1, 1] also protects the actuator 12 from unintentional actuation due to varying conditions of the system 10, e.g. vibration of the mechanical system 10 or sudden local temperature transients. Reducing the stimulus to the active material element 20 may maintain the actuator 12 in the second position $P_2$ or return the actuator to a position close to the first position $P_1$ depending on the actuator 12 and the amount by which the stimulus is reduced. One skilled in the art would be able to determine by how much the stimulus for an actuator 12 should be reduced once the priming device 38 has indicated the actuator 12 is in the primed state 34.

The priming device 38 determines when the actuator 12 is in the second state 34. In this embodiment the priming device 38 measures the deflection of the active material element 20 through the priming distance δ. Preferably, the priming device 38 is able to determine when the actuator 12 is in the second state 34 without requiring complicated sensors or controls for monitoring and calculating past and present conditions of the active material element 20, the actuator 12, the mechanical system 10, or the environment. The signal, i.e.

current, from the controller 18 is gradually increased in strength until the priming device 38 determines the actuator 12 has shifted from the un-actuated state 32 to the predetermined second state 34. At this point the first estimate of the priming current $i_{P1}$ has been reached. The controller 18 may indicate that the actuator 12 should be moved to the second state 34 upon certain conditions of the mechanical system 10, e.g. at a vehicle start or when the system 10 predicts impending use of the actuator 12 based on internal logic and status of various on-vehicle (e.g. seat occupancy) or off-vehicle (e.g. smart grid-based) sensors.

For example, referring to FIGS. 1-3, the priming device 38 is described for use with the load 14. The controller 18 initiates a stimulus, such as heat or a voltage or current provided by an energy source 16 in order to change a variable property of the active material element 20, such as its length. The stimulus to the active material element 20 is increased until the active material element 20 is heated to a degree sufficient to contract the active material element 20 by a priming distance δ. In the embodiment shown, the priming device 38 is a contact switch or a photo-interrupter that signals the controller 18 (connection not shown) when the active material element 20 has moved through the priming distance δ.

Therefore, the mechanical system 10 and method of actuating the mechanical system 10 includes determining the priming stimulus level without using expensive sensors and signal processing or relying on fixed look-up tables. This is accomplished by using a two-stage actuation method as described herein. The first stage serves to determine the priming stimulus level for the current state of the system 10 and the environment around the system 10 without producing a significant movement of the load 14, while the second stage serves to move the load 14 through the desired motion.

Referring to FIGS. 4-6, a mechanical system 110 includes a second embodiment of an actuator 112 for applying a motive force $F_M$, to a coupled load 114. The actuator 112 applies a first or priming force $F_P$ on the load 114 or applies a second or motive force $F_M$ on the load 114 in order to impart a desired motion to the load 114, for example to move the load 114 through a predetermined motive distance "d". The actuator 112 can be configured as a rotary actuator, such as an electrical motor, or a linear actuator, as will be described below. The actuator 112 includes an active material element 120. The actuator 112 can be selectively activated or energized by a controller 118 to provide a suitable motive force $F_M$.

In the embodiment shown, the active material element 120 is a shape memory alloy (SMA) that is fastened or connected to a stationary member 122 and to a coupler 126 at opposing ends. The coupler 126 can be a simple connecting body as shown in FIGS. 4-6, or it can be a transmission sized as needed to ensure a sufficient amount of amplification of force, motion, and/or frequency of the actuator 112 when the actuator 112 is activated or stimulated.

An overload element 128 may be connected between the active material element 120 and the stationary member 122 to protect the active material element 120 from any overloading that may occur during actuation of the actuator 112. Additionally, a biasing element 130 may be fastened or connected to the stationary member 122 and to the coupler 126 in a parallel arrangement with the active material element 120. The biasing element 130 may apply a biasing force on the load 114 to ensure the load 114 returns to a first position $P_1$ when the actuator 112 is shifted from an actuated state 136 (illustrated in FIG. 6) back to an un-actuated state 132 (illustrated in FIG. 4). Additionally, the force from the biasing element 130 may also assist in returning the active material element 120 to the original state or length when the actuator 112 is shifted from the actuated state 136 back to the un-actuated state 132. As mentioned above, the use of a bias element 130 may not be necessary when the external load 114 provides a means to effect or assist in returning the system 10 from the second state 134 or the third state 136 to the first states, shown at 132. As an example, when the load 114 is a dead load, as described herein, the load 114 may provide the bias required to return the active material element 120 to the first position $P_1$.

In the embodiment shown in FIGS. 4-6, the actuator 112 is configured to operate over a wide range of temperatures and to adjust for changing conditions of the mechanical system 110 and the actuator 112. As in the embodiment described above, adjusting the mechanical system 110 is achieved by pre-heating or priming the actuator 112 using a first estimate of the pre-heating or priming current $i_{P1}$. The controller 118 supplies a predetermined actuation current $i_A$ to an auxiliary SMA actuator 142 that comprises an auxiliary SMA element 144. The auxiliary SMA actuator 142 is a part of the actuator 112. The auxiliary actuator 142 is sized such that the auxiliary force ($F_A$) developed by the auxiliary device 142 in response to the above mentioned actuation current $i_A$ is less than the motive force ($F_M$) required to produce onset of motion in the load 114. Moreover, the stroke of the auxiliary SMA actuator 142 is substantially smaller than the stroke of the main SMA actuator 112 or the distance 'd' through which the load 114 needs to be moved. The controller 118 then applies an increasing actuation current to the main SMA actuator 120 until onset of motion in the load 114 is detected in a robust manner. In this embodiment, the onset of motion in the load 114 is inferred when the coupler 126 moves through the pre-determined priming distance δ. The current flowing through the SMA element 120 when this happens is the first estimate of the priming current $i_{P1}$. The motion of the actuator 112 is detected by the auxiliary device 138, which communicates the change in configuration of the system 10 from the first state 132 to the second state 134 to the controller 118. The controller 118 then powers off the auxiliary actuator 142 and maintains a priming current ($i_P$) through main SMA 120 until the system 110 receives the signal to move the load 114 through the motive distance, until the system 110 times out, or until the operation is aborted. The distance δ is chosen to be a much smaller distance than the motive distance 'd' while still being reliable measurable by the system 138.

While the priming current $i_P$ can be based on the first estimate of the priming current $i_{P1}$ in a very general manner, in this embodiment the auxiliary actuator 142 and the main actuator 112 are sized relative to the load 114 such that priming current $i_P$ is approximately equal to the first estimate of the priming current $i_{P1}$. This further reduces the need for signal processing in the estimation of a priming current $i_P$. After the determination of priming current $i_P$ is completed and the controller 118 has powered off the auxiliary actuator 142, the system 110 may return to its primed configuration that is intermediate e in appearance to the first state 132 and the third state 136. The controller 118 can now effect a transition of the system 110 to the fully actuated position 136 by supplying the main SMA element 120 with a pre-determined heating current $i_M$ that causes the load 114 to move through the distance 'd' Alternatively, the controller 118 may effect a transition back to the configuration 132 by powering off 120.

The priming force $F_P$, which is the force developed in the main actuator 112 when the system is in its primed state, is less than the force required to cause onset of motion at the load 114 by the force $F_A$ developed in the auxiliary actuator 142 when the system achieves the second configuration 134.

Therefore, the priming force $F_P$ is not sufficient to move the load 114. The priming distance δ is preferably a minimal amount of deflection of the total deflection that is required by the active material element 120 to move the load 114. In one embodiment, the priming distance is 5-20% of the total deflection of the active material element 120 to move the load 114. As small margin of error for deflection of the active material element 120 may be allowed to compensate for motions occurring external to the operation of the actuator 12, e.g. vibrations of the mechanical device 110 causing minute deflections of the active material actuator 120. Therefore the priming distance δ may allow for 1-2% deflection of the active material element 120 before the priming device 138 is engaged.

In the second state 134 the active material element 120 is deflected through the priming distance δ and the load 114 is correspondingly moved to the second position $P_2$. The priming current $i_P$ is a fraction of the actuation or motive current $i_M$; supplied to move the load 114 from position in the primed state (not shown) to the actuated position $P_3$. The remaining portion of the motive force $F_M$ is provided when the actuator 112 is actuated and the load 114 is moved to the third actuated position $P_3$. By moving the actuator 112 from the un-actuated state 132 to the primed state any variations in actuation time of the active material element 120 may be mitigated. Therefore, upon actuation, i.e. when the actuator 112 moves from the primed state to the actuated state 136, a user of the mechanical system 110 will see a reduced variation in actuation time than if the system 110 was transitioning from the un-actuated state 132 to the actuated state 136. It is important to understand that the reduction in the actuation time is primarily due to the reduced sensible heat input needed to actuate the SMA element 120 because it is pre-heated to a temperature above the ambient temperature but below its actuation temperature. As mentioned earlier, the primed state may be intermediate to the un-actuated state 132 and the actuated state 136 in appearance. Any pre-travel of the load 114 in going from the un-actuated state 132 to the primed state is insignificant and does not contribute in a significant way to the reduction in the actuation time. Generally, when the actuator 112 is in the first or un-actuated state 132, the load 114 is located in the first position $P_1$. When the actuator 112 is in the second state 134 the load 114 is in the second position $P_2$. The second state 134 is associated with reliable detection of the onset of motion of the load 14, as explained herein. The controller 118 may indicate that the actuator 112 should be moved to the primed state upon certain conditions of the mechanical system 110, e.g. at a vehicle start and the associated control logic. The actuator 112 then remains in the primed state until receiving the second activation signal from the controller 118. Upon receiving the second activation signal, the controller 118 increases the stimulus applied to the actuator 112 to the level $i_M$ that causes the system 10 to transition from the primed state to the third or actuated state 136 and the load 114 is moved from the primed position to the third position $P_3$. Alternatively, the actuator 112 may remain in the primed state for a pre-determined amount of time before returning to the un-actuated state 132. The actuator 112 may then be periodically re-primed to ensure consistent actuation of the mechanical system 110 while providing an economical utilization of the energy source 116.

Referring to FIGS. 4-6, the priming device 138 includes a contact switch 140. In the embodiment shown, the auxiliary actuator 142 includes an auxiliary active material element 144 that is arranged mechanically in parallel with the main active material element 120.

Referring to FIGS. 7-9, a mechanical system 210 includes a third embodiment of an actuator 212 for applying a motive force $F_M$, to a coupled load 214. The actuator 212 can be configured as a rotary actuator, such as an electrical motor, or a linear actuator, as will be described below. The actuator 212 can be selectively activated or energized by a controller 218 to provide a suitable motive force $F_M$.

The actuator 212 of FIGS. 7-9 may be constructed partially or fully of an active material element 220 (e.g. a thermally activated SMA) having predetermined properties, for example a variable length or stiffness value that varies actively in response to an applied stimulus, such as resistive heating or a voltage from the energy source 216. In the embodiment shown, the active material element 220 is a shape memory alloy (SMA) that is fastened or connected to a stationary member 222 at one end and to a priming device 242 at an opposing end. The priming device 242 comprises a spring 246 connected to a coupler 226 and a priming detection system further comprising first and second elements 248, 240 of a contact switch that are spaced δ apart in the un-actuated state of the system 210, shown in FIG. 7. The coupler 226 shown in FIGS. 7-9 is a simple rigid link, however the coupler 226 may take the form of a transmission (e.g. a linkage) that can be designed to provide amplification of force, motion, and/or frequency of the actuator 212 when the actuator 212 is activated or stimulated. Whatever the embodiment, the actuator 212 is coupled via the priming spring 242 and the coupler 226 to the load 214, and activated as needed to move the load 214 through the motive distance 'd' in the desired manner.

An overload element 228 may be connected between the active material element 220 and the stationary member 222 to protect the active material element 220 from any overloading that may occur during actuation of the actuator 212. Additionally, a biasing element 230 may be fastened or connected to the stationary member 222 and to the coupler 226 in a parallel arrangement with the active material element 220. The biasing element 230 may apply a biasing force on the load 214 to ensure the load 214 returns to a first position $P_1$ when the actuator 212 is shifted back to an un-actuated state 232 (illustrated in FIG. 7). As described earlier, the biasing element 320 assist in returning the active material element 220 to the original state or length when the actuator 212 is shifted back to the un-actuated state 232. Alternatively, the biasing element 320 may not be needed if the external load 214 works to restore the system to its un-actuated configuration (232) when the active material is not activated.

Starting at the first or un-actuated configuration 232, the controller 218 ramps up the current flowing through the SMA element 220 until the system 210 reaches the second state 234. When the current flowing through the SMA element 220 becomes high enough to begin activating the SMA element 220, than the SMA element 220 exerts an increasing force on the priming spring 246. When this force exceeds the preload in the spring 246, the spring 246 deflects causing the second element 240 to move closer to the first element 248. When the force developed by the SMA element 220 is sufficient to deflect the priming spring 246 through the priming distance δ, it brings first and second elements 240 and 248 of the motion detection system into contact thereby signaling detection of the second state 234. The second element 240 also serves to mechanically couple the actuator element 220 directly to the coupler 226. As an example, the second element 240 may be a tab that mechanically interferes with the coupler 226. This interference leads to a one-way coupling that connects the SMA actuator element 220 directly to the coupler 226, thereby bypassing the priming spring 246 for any further contraction in the SMA element 220. The priming spring 242 is sized such that the force ($F_P$) required to stretch the priming spring 242 by the predetermined priming distance δ is given as $F_P=\alpha F_M$, wherein α is [0.1, 0.98] and $F_M$ is the force needed to produce onset of motion of the load 214.

A motion detection sub-system 238 (e.g. a contact switch or a photo-interrupter) is used to detect when the priming spring 242 has stretched by δ. When the priming spring has stretched the priming distance the magnitude of the current flowing through the SMA element 220 is the first estimate $i_{P1}$ of the priming current $i_P$. The actual priming current $i_P$ can depend on the first priming current $i_{P1}$ in a general or non-linear manner. However, typically, the system 10 is designed such that priming current $i_P=i_{P1}$ the first estimate of the priming current. As in the previous embodiment, the estimation of the priming current $i_{P1}$ reduces the computational burden of determining the priming current $i_P$, while still providing a robust estimate of $i_P$. Once the priming spring has stretched through the priming distance δ, the SMA element 220 is mechanically coupled direction to the coupler 226, i.e. the priming spring 242 is mechanically shorted and the SMA element 220 drives the output load 214 directly via the coupler 226. Note that as the coupling is achieved by contact between the element 240 that is rigidly connected to the SMA element 220 and the coupler 226, the coupling constrains the load 214 to move with the SMA element 220 only for one direction of motion, e.g. when the SMA element 220 is moving the load from the first position $P_1$ towards the third position $P_3$. Thus the coupling is effective only for motion in one direction; the SMA element 220 cannot drive the load 214 in the opposite direction by itself. Further, note that as $F_P<F_M$, the load 214 has not moved significantly during the transition of the system 210 from configuration the first state 232 to the second state 234, i.e. P2 is approximately equal to P1. Thus, this embodiment is especially suitable for application in which the load 214 should not be moved significantly during the estimation of the priming current $i_P$.

Once the priming current has been determined, the controller 218 may maintain the system 10 in the primed state by maintaining the priming current $i_P$ until the current must be changed to change the state of the system 210. Alternatively, the controller 218 may transition the system from the primed state to the actuated state 236 by increasing the current flowing through the SMA element 220 to the value $i_M$ that is sufficient to produce a force $F_M$ at the load 214. This force $F_M$ is sufficient to drive the output load 214 to move through the distance 'd' from the first position $P_1$ to the third position $P_3$. Alternatively, the controller 218 may revert the system 210 back to the un-actuated state 232 by stopping current flow through the SMA element 220 as described earlier.

By moving the actuator 212 from the un-actuated state 232 to the primed state (not shown) any variations in actuation of the active material element 220 may be compensated for. Therefore, upon actuation, i.e. when the actuator 212 moves from the primed state to the actuated state 236, a user of the mechanical system 210 will see little variation in actuation time. The actuator 212 then remains in the primed state until receiving an activation signal from the controller 218. Upon activation by the controller 218, the actuator 212 is shifted from the primed state 234 to the third or actuated state 236 and the load 214 is moved from the second position $P_2$ to the third position $P_3$. Alternatively, the actuator 212 may remain in the primed state for a pre-determined amount of time before returning to the un-actuated state 232. The actuator 212 may then be periodically re-primed to ensure consistent actuation of the mechanical system 210 while providing an economical utilization of the energy source 216.

Referring to FIGS. 7-9, the priming device 238 includes a contact switch 240 and an auxiliary device 242. In the embodiment shown, the auxiliary device 242 includes a spring 246 that is arranged in series with the active material element 220.

The controller 218 initiates a stimulus, such as heat or a voltage or current provided by an energy source 216 in order to change a variable property of the active material element 220. The current to the active material element 220 is increased until the active material element 220 is heated to a degree sufficient to contract the active material element 220 the priming distance δ. When the actuator 212 is in the un-actuated state the active material element 220 may translate relative to the coupler 226. Thus, contracting the active material element 220 also causes the spring 246 to deflect the priming distance δ, allowing the contact switch 240 to close without moving the load 214. The contact switch 240 signals the controller 218 (connection not shown) when the active material element 220 has moved the priming distance δ and the active material element 220 is exerting the priming force $F_P$. However, the priming force $F_P$ results in deflection of the spring 246 rather than movement of the load 214. Once the contact switch 240 signals the controller 218 that the active material element 220 has deflected the priming distance δ the controller 218 closes a locking device 248 that is part of the auxiliary device 242 and mechanically couples the SMA element 220 to the coupler 226. The locking device 248 thereafter prevents relative motion of the active material element 220 and the coupler 226. Further deflection by the active material element 220 will cause motion of the coupler 226 and the load 214. Therefore, the locking device 248 selectively fixes the active material element 220 to the coupler 226 depending on the state of the actuator 212.

In actuating motion of the load 214 from the un-actuated position $P_1$ to the second position $P_2$ the current to the active material element 220 may be applied until the active material element 220 moves the priming distance δ. The force exerted by the active material element 220 to cause deflection the priming distance δ will be proportional to the strength of the spring 246. Therefore, the priming force $F_P$ may be a predetermined portion of the motive force $F_M$. Due to the relative size of the active material element 220 and the spring 246 the priming force $F_P$ may be selected to be a substantial portion of the calculated motive force $F_M$ and may be associated with the onset of motion of the load 214. One skilled in the art would be able to determine an appropriate priming force $F_P$ and then determine the appropriate spring rate for spring 246 to achieve the selected priming force $F_P$ for a particular mechanical system 210.

To actuate the actuator 212 the controller 218 may send a sufficient stimulus, i.e. current, to increase a substantial or full amount of the active material element 220 above the characteristic temperature, thereby generating the motive force $F_M$. Variations in environment may result in time variations for the portion of the active material element 220 to contract the priming distance δ. In this manner, the priming device 238 approximates the onset of motion of the actuator 212 and the response of the mechanical system 210 can be tailored to match the existing environmental and system conditions by priming the actuator 212 and maintaining a constant actuation time of the mechanical system 210.

Referring to FIGS. 10-12, a mechanical system 310 includes a fourth embodiment of an actuator 312 for applying a motive force $F_M$, to a coupled load 314. The actuator 312 applies a first or priming force $F_P$ on the load 314 and thereafter applies a second or motive force $F_M$ on the load 314 in order to impart a desired motion to the load 314, for example to move the load 314 through a predetermined motive distance "d". The actuator 312 includes an active material element 320 at least partially of an active material such as a shape memory alloy (SMA). The actuator 312 can be selectively activated or energized by a controller 318 to provide a suitable motive force $F_M$.

The actuator 312 of FIGS. 10-12 may be constructed partially or fully of an active material element 320 having predetermined properties, for example a variable length or stiffness value that varies actively in response to an applied stimulus, such as resistive heating or a voltage from the energy source 316. In the embodiment shown, the active material element 320 is a shape memory alloy (SMA) that is fastened or connected to a stationary member 322 and to a coupler 326 at opposing ends. The coupler 326 can be a transmission that is sized as needed to ensure a sufficient amount of amplification of force, motion, and/or frequency of the actuator 312 when the actuator 312 is activated or stimulated. Whatever the embodiment, the actuator 312 is coupled to the load 314, and activated as needed to move the load 314 through the motive distance d in an optimally efficient manner.

An overload element 328 may be connected between the active material element 320 and the stationary member 322 to protect the active material element 320 from any overloading that may occur during actuation of the actuator 312. Additionally, a biasing element 330 may be fastened or connected to the stationary member 322 and to the coupler 326 in a parallel arrangement with the active material element 320. The biasing element 330 may apply a biasing force on the load 314 to ensure the load 314 returns to a first position $P_1$ when the actuator 312 is shifted from an actuated state 336 (illustrated in FIG. 12) back to an un-actuated state 332 (illustrated in FIG. 10). Additionally, the force from the biasing element 330 may also assist in returning the active material element 320 to the original state or length when the actuator 312 is shifted from the actuated state 336 back to the un-actuated state 332. The biasing element 330 is needed when the external load 314 does not assist in restoring the un-actuated state 332 of the actuator 312 after the active material element 320 has been de-activated.

By moving the actuator 312 from the un-actuated state 332 to the primed state (not shown) before the actuator 213 needs to move the output load 314 any variations in actuation time corresponding to the sensible heating the active material element 320 may be compensated for. Therefore, upon actuation, i.e. when the actuator 312 moves from the primed state4 to the actuated state 336, a user of the mechanical system 310 will see little variation in actuation time.

Further, once the actuator 312 has reached the primed state the controller 318 may reduce the amount of stimulus applied to the active material element 320 to ensure the actuator 312 does not actuate at an undesirable time, i.e. to ensure that environmental conditions such as vibration of the mechanical device 310 does not accidentally actuator the actuator 312. One skilled in the art would be able to determined if the stimulus for an actuator 312 should be reduced once a priming device 338 has indicated the actuator 312 is in the second state 334.

The actuator 312 then remains in the primed state until receiving an activation signal from the controller 318. Upon actuation by the controller 318 the actuator 312 is shifted from the primed state to the third or actuated state 336 and the load 314 is moved to the third position $P_3$. Alternatively, the actuator 312 may remain in the primed state for a pre-determined amount of time before returning to the un-actuated state 332. The actuator 312 may then be periodically re-primed to ensure consistent actuation of the mechanical system 310 while providing an economical utilization of the energy source 316.

Referring to FIGS. 10-12, the priming device 338 is described for use with the load 314. The priming device 338 includes a contact switch 340 and an auxiliary device 342. In the embodiment shown, the auxiliary device 342 includes the spring 346 that is arranged generally perpendicular with the active material element 320. The active material element 320 in a 'bow string' arrangement. The active material element 320 is a wire that has attached to the coupler 326 such that an angle Θ is formed between the active material element 320 and a line perpendicular to the coupler 326. The spring 346 is secured to a stationary element 350 at one end and to a support element 352 at the opposing end. The support element 352 secures the spring 346 to the main active material element 320.

The controller 318 initiates a stimulus, such as heat or a voltage or current provided by an energy source 316 in order to change a variable property of the active material element 320. The current to the active material element 320 is increased until the active material element 320 is heated to a degree sufficient to contract the active material element 320 and move the spring 346 over the priming distance δ. A deflection of the spring 346 over the priming distance δ, by the active material element 320, will cause a proportional amount of movement of the load 314 from the first position $P_1$ to the second position $P_2$. The distance between the first position $P_1$ and the second position $P_2$ may be so little it is considered negligible. Therefore, in the embodiment shown, the first position $P_1$ and the second position $P_2$ are indicated as the same. Knowing the angle Θ formed between the active material element 320 and the coupler 326 and the desired distance the actuator 312 moves to the primed position $P_2$, the priming distance δ can be calculated by utilizing the equation:

$$\delta = \frac{2\tan\Theta(F_1 + k_1 P_{12}) - F_S}{k_P}$$

where $k_1$ is the spring rate of the load 314, $P_{12}$ is the distance between $P_1$ and $P_2$ as measured along the direction of motion of the load 314, $F_1$ is the force on the active material element 320 when the actuator 312 is in the un-actuated position, $k_P$ is the spring rate of the priming spring and $F_s$ is the force on the priming spring 346 when the actuator 312 is in the un-actuated position.

The contact switch 340 signals the controller 318 (connection not shown) when the spring 346 has moved the priming distance δ. The second state 334 is associated with the onset of actuation in the active material element 320. The priming distance δ is preferably a minimal fraction of the total deflection that is required by the active material element 320 to move the load 314. By utilizing the bow-tie arrangement the priming distance δ, which is the deflection of the spring 346, may be more than the deflection of the active material element 320. Thus, the amount of deflection by the active material element 320 to move the spring 346 the priming distance is reduced. Therefore, the deflection of the active material 320 to prime the actuator 312 is reduced compared to the total deflection of the active material element 320 to move the load 314. As small margin of error for deflection of the active material element 320 may be allowed to compensate for motions occurring external to the operation of the actuator 312, e.g. vibrations of the mechanical device 310 causing minute deflections of the active material actuator 320.

In actuating motion of the load 314 from the un-actuated position $P_1$ to the position $P_2$ the current to the active material element 320 may be increased progressively until the spring 346 deflects the priming distance δ. The amount of deflection caused by active material element 320 to the spring 346 will be proportional to the strength of the spring 346. Therefore, the priming force $F_P$ may be a predetermined portion of the motive force $F_M$. Due to the relative size of the active material element 320 and the spring 346 the priming force $F_P$ may be selected to be a substantial portion of the calculated motive force $F_M$. One skilled in the art would be able to determine an appropriate priming force $F_P$ and then determine the appropriate spring rate $k_P$ for spring 346 to achieve the selected priming force $F_P$ for a particular mechanical system 310.

The active material element 320 is arranged in a 'bow-string' configuration in FIG. 10 such that a small change in the length of the SMA element 320 yields a significant change in the transverse motion of the apex, i.e. the priming device 338. The geometry of the 'bow-string' configuration requires that a horizontal motion at the coupler 326 be accompanied by a much greater vertical motion at the support element 352. Given the known length of the SMA element 320 and the known angle Θ between the SMA element 320 and the coupler 326 the horizontal movement at the coupler 326 and the vertical movement at the support element 352 can be calculated. The SMA element 320 carries a member 352 at its apex. The member 352 is constrained to move in the direction transverse to the nominal run of the SMA element 320. The motion of the SMA element 320 in the vertical direction is counteracted by a priming spring 346 that is connected between the member 352 and the ground 350. The controller 318 begins the priming process by passing an increasing current i through the SMA element 320. As the force developed on the SMA element 320 increases, the SMA element 320 straightens out before the SMA element 320 exerts the full load on the coupler 326. The design parameters for the bow-string configuration i.e. the angle (Θ), the stiffness of the priming spring 346 and the transverse distance δ are selected such that the force developed in the SMA element 320 is sufficient to overcome the resistance of the priming spring 346 and deflect the apex of the bow-string arrangement through the priming distance δ as seen in the second state 334 (shown in FIG. 11), before the load on the SMA element 320 is sufficient to produce the onset of motion in the external load 314. The deflection of the apex through the priming distance δ is detected and flagged by an auxiliary system 342. The current i flowing through the SMA element 320 when the deflection happens is the first estimate of the priming current $i_{P1}$. The actual priming current $i_P$ can depend on the first estimate of the priming current $i_{P1}$ in a general or non-linear manner. However, typically, the system is designed such that the priming current $i_P$ equals the first estimate of the priming current $i_{P1}$. As in the previous embodiment, this arrangement reduces the computational burden of determining the priming current $i_P$ while still providing a robust estimate of $i_P$. Recall that the geometry of the bow-string configuration and the stiffness of the priming spring 346 have been chosen to ensure that the force developed by the SMA element 320 in the second state 334 is less than that required to produce onset of motion in the external load 314. Furthermore, because of the displacement amplification produced by the bow-string configuration, the axial motion of the SMA element 320 at the coupler 326 is smaller than the transverse motion of the SMA element 320 at its apex. Both of these factors combine to ensure that the output load 314 experiences little, if any, motion during the transition of the system 310 from the first state 332 to the second state 334. As before, the controller 318 may choose to maintain the system 310 in the primed state (not shown) while it awaits further instructions by keeping the current at priming current $i_P$. The geometry of the bow-string configuration and the stiffness of the priming spring 346 are also influenced by the requirement that keeping the current i flowing through 320 fixed at the level $i_P$ produces no hazardous conditions or deterioration in the short or long term performance of the system 310. If the controller 318 receives instructions to move the output load 314 through the distance 'd' while the system 310 is in its primed state, the actuator 312 only has to increase the current flowing through the SMA element 320 to $i_M$ such that the corresponding force developed by the SMA element 320 is sufficient to overcome any resistance to the motion of the output 314 through 'd' as shown in the third state 336 (FIG. 12). Alternatively, the controller 318 may transition the system 310 from the primed state to the un-actuated state 332 by shutting off current flow through SMA element 320.

Referring to FIGS. 13-16, a mechanical system 410 includes a fifth embodiment of an actuator 412 for applying a motive force $F_M$, to a coupled load 414. The actuator 412 includes an active material element 420 constructed at least partially of an active material such as a shaped memory alloy (SMA) or other active or "smart" material, as described in greater detail above. The actuator 412 can be selectively activated or energized by a controller 418 to provide a suitable motive force $F_M$. The active material element 420 is a shape memory alloy (SMA) that is fastened or connected to a stationary member 422 and to a coupler 426 at opposing ends. The coupler 426 can be a rigid link as shown or a transmission that is designed to ensure a sufficient amount of amplification of force, motion, and/or frequency of the actuator 412 when the actuator 412 is activated or stimulated. An overload element 428 may be connected between the active material element 420 and the stationary member 422 to protect the active material element 420 from any overloading that may occur during actuation of the actuator 412. Additionally, a biasing element 430 may be fastened or connected to the stationary member 422 and to the coupler 426 in a parallel arrangement with the active material element 420. The biasing element 430 may apply a biasing force on the load 414 to ensure the load 414 returns to a first position $P_1$ when the actuator 412 is shifted from an actuated state 436 (illustrated in FIG. 15) back to an un-actuated state 432 (illustrated in FIG. 13).

This embodiment differs from those above in that the mechanical system 410 has an auxiliary system 442 dedicated to the task of estimating a suitable priming current $i_P$ for the main actuator 412, i.e. detecting the onset of motion of the load 414 prior to any actual motion of the load 414. The auxiliary or priming sub-system 442 shares many of the same features, e.g. an SMA element 444, a coupler 454, and, optionally, a mechanical overload spring 473). But the priming sub-system 442 is not coupled to the output load 414, instead the auxiliary SMA element 444 in this sub-system 442 works against the bias spring 475 to move the coupler 454 (to the left as shown in FIGS. 13-15). The priming sub-system 442 also has a displacement detection capability 440, e.g. a contact switch, a photo-interrupter, etc., that can detect the motion of the coupler 454 and specifically, detect the motion of the coupler 454 through the prescribed displacement threshold of δ.

The SMA element 420 in the main actuator 412 and the SMA element 444 in the priming sub-system 442 are electrically connected in series so that the same heating current $i_P$ flows through both of them when the priming by-pass switch 474 is open. The priming sub-system 442 is sized such that the auxiliary SMA element 444 develops a force $F_A$ that is able to move the auxiliary coupler 454 through the priming distance δ at a heating current value $i_P$ that is smaller than the heating current value ($i_M$) needed to develop a motive force in the main SMA element 420 sufficient to produce onset of motion in the output load 414. Smaller diameter SMA actuator wires, typically, develop a smaller maximum force than their larger counterparts. Moreover, the smaller diameter wires develop their maximum force at a lower heating current magnitude than their larger diameter counterparts. Hence, one way of sizing the priming sub-system 442 appropriately is to make the priming SMA element 444 of a smaller diameter than the main SMA element 420 such that the above relationship holds between the currents required in and the corresponding forces developed by the auxiliary SMA element 444 and the main SMA element 420.

To begin, the system 410 is in the un-actuated configuration 432 with the bypass switch 474 open. To prime the main SMA element 420, the controller 418 increases the current i flowing through both SMA elements 420 and 444 at a pre-determined rate until the auxiliary coupler 454 of the priming sub-system 442 has moved through the priming distance δ, as shown in FIG. 14. As described above, the heating current flowing through both SMA elements at this time is $i_{P_1}$, which is the first estimate of a suitable priming current $i_P$ for the main SMA element 420. The actual priming current $i_P$ can depend on the first estimated $i_{P_1}$ in a general or non-linear manner. However, typically, we design the system such that $i_P = i_{P_1}$. As in the previous embodiment, this arrangement reduces the computational burden of determining the priming current $i_P$ while still providing a robust estimate of $i_P$. The actual primed configuration may differ from that shown in 434 especially if $i_P \neq i_{P_1}$. The priming sub-system 442 is designed such that the priming current $i_P$ is sufficiently smaller than the main actuation current $i_M$ so that there is little or no motion of the load 414 when the system 410 transitions from the un-actuated configuration 432 to the second state 434 shown in FIG. 14. In other words, the position $P_2$ of the output load 414, as shown in FIGS. 13-15, is approximately equal to the first position $P_1$. Once the priming current $i_P$ has been determined there is no further need for the SMA element 444 in the priming sub-system 442 to remain activated. Hence, the controller 418 closes the switch 474, which results in the heating current bypassing the priming sub-system 442. The priming sub-system 442 subsequently reverts back to the un-actuated configuration 432, as shown in FIG. 13. Now, the controller 418 can maintain the main actuator 412 in the primed state by passing $i_P$ through the SMA element 420. Note that the change in the electrical circuit due to the closing of the bypass switch 474 will require the controller 418 to adjust the power settings in order to maintain the current flowing through the main SMA element 420 at the level $i_P$. The controller 418 keeps the main actuator 412 in the primed state until it is required to transition the system to its fully actuated state 436. Alternatively, the controller 418 may transition the actuator 412 back to its un-actuated state 432 if one or more of the conditions discussed earlier are encountered. To transition the actuator 412 from the primed state to the fully-actuated state 436, the controller 418 increases the current flowing through the main SMA element 420 from the priming current $i_P$ to the motive current $i_M$ while keeping the switch 474 closed. This causes the main SMA element 420 to develop a motive force $F_M$ that moves the output load 414 through the prescribed distance 'd.' To transition the actuator 412 from the primed or the fully actuated state 436 back to the un-actuated state 432, the controller 418 reduces the current flowing through the SMA element 420 to zero and opens the switch 474. The ability to size, package and locate the priming sub-system 442 substantially independently of the size, packaging and location of the main actuator 412 offers additional design freedom.

In some applications, especially those that require frequent cyclic motion of the output load 414, it may be advantageous to have a bypass switch 474 that has a finite, and possibly thermally compensated, resistance instead of a very low value that is typical of closed switches or relays. This ensures that the auxiliary SMA element 444 in the priming sub-system 442 also remains warm thereby reducing the risk of accidental actuation of the main load 414 when determining the priming current $i_P$ using the above approach, while the main SMA element 420 is still warm from a previous operation and the auxiliary SMA element 444 from the priming sub-system 442 has cooled significantly. Although, this should be unnecessary under typical conditions wherein the determination of a suitable priming current $i_P$ is done only once for any given period of intermittent or continuous use.

Alternatively, the current flowing through the priming SMA element 444 may be proportional to that flowing through the main SMA element 420 instead of having the same current flowing through the two SMA elements 412 and 444 before the second state 434 is attained. As an example, a current divider may be used to set the current flowing through the SMA element 420 in the priming sub-system 442 as a fixed multiple of that flowing through the main SMA element 420. This takes the physical de-coupling of the main actuator 412 and the priming sub-system 442 farther and offers more opportunities for optimizing the system 410.

To actuate the actuator 412, the controller 418 may send a sufficient stimulus, i.e. current, to increase a substantial or full amount of the active material element 420 above the characteristic temperature, thereby generating the motive force $F_M$. Variations in environment may result in time variations for the auxiliary active material element 444 to contract the priming distance δ. Those same conditions will occur for the main auxiliary active material element 444. Therefore, time variation occurring to reach the auxiliary force $F_A$ and contract the auxiliary active material element 444 will be generally the same variations that occur with the main active material element 420. In this manner, priming device 438 approximates the onset of motion of the load 414 and the response of the mechanical system 410 can be tailored to match the current conditions by priming the actuator 412 and maintaining a constant actuation time of the mechanical system 410.

Referring to FIG. 16, a schematic diagram of a control circuit 460 for use with the mechanical system 410 of FIGS. 13-15 is illustrated. The control circuit 460 utilizes a detector 462 and emitter 464 that are located proximate to the mechanical system 410 and spaced apart from one another. The detector 462 and emitter 464 are used in place of the contact switch 440 shown in FIG. 13-15. The mechanical system 410 is illustrated in the un-actuated position $P_1$. The actuator 412 and the auxiliary device 442 are connected to the controller 418 in parallel with one another. An auxiliary load 454 is attached to the auxiliary active material element 444 between the detector 462 and the emitter 464 and a main load 414 is attached to the main active material element 420. In the un-actuated state illustrated, the auxiliary load 454 is located between the detector 462 and emitter 464 to block a signal from the emitter 464 from reaching the detector 462. The controller 418 applies a gradually increasing stimulus to the main active material element 420 and the auxiliary active material element 444. For example, the controller 418 may apply a pulse width modulation (PWM) signal at a low duty cycle to the main active material element 420 and the auxiliary active material element 444. The duty cycle may gradually increase until the auxiliary SMA element 444 starts to contract. When sufficient stimulus is provided (i.e. the duty cycle of the PWM signal has sufficiently increased) the auxiliary active material element 444 contracts and the auxiliary load 454 is moved from between the detector 462 and the emitter 464. The detector 462 now may receive a first signal from the emitter 464, which results in second signal being sent to the controller 418 to record the level of stimulus applied. This is the first estimate of the priming current $i_{P1}$. The controller 418 stops sending current to the auxiliary active material element 444 when the first estimate priming current $i_{P1}$ is recorded. The controller 418 then derives a priming current level $i_P$ as discussed earlier and maintains this current through the main actuator 412 until it is actuated or reverted back to the un-actuated state 432. To actuate the actuator 412 the controller 418 then sends the motive current $i_M$ to the main active material element 420.

In addition to actuating the device 410 the main active material element 420 moves the load 414 until it is located between the detector 462 and emitter 464. As the main active material element 420 contracts a support 470 is rotated about a pivot 472 allowing the load 414 is translated until the signal between the emitter 464 and the detector 462 is again interrupted. The detector 462 then sends a third signal to the controller 418 that the mechanical system 410 has actuated.

Alternately, if the system is in the primed state for a prolonged period of time, the auxiliary active material element 444 may expand (i.e. cool, since it is no longer receiving a stimulus). The expanding auxiliary active material element 444 will cause the auxiliary load 454 to interrupt the first signal from the emitter 464. As before, interrupting the first signal from the emitter 464 results in the detector 462 sending the third signal to the controller 418 to reset the system. This may need to be repeated prior to the actuator 412 being actuated. The duty cycle is recorded by the controller 418 each time the first signal is interrupted.

The maximum useful force exerted by the auxiliary SMA element 444 bears a known ratio to that exerted by the main SMA element 420. This is accounted for by the controller 418. For example, if the auxiliary SMA element 444 takes half the power to active then to actuate the main SMA element 420 the duty cycle to provide motive current $i_M$ is double that of the priming current $i_P$, as long as the same voltage is applied. Alternatively, the auxiliary load 454 on the auxiliary SMA element 444 and the size, e.g. diameter, length, spring stiffness, etc. of the auxiliary SMA element 444 is such that the current at which the auxiliary SMA element 444 moves is a suitable priming current $i_P$ for the main SMA element 420 and load 414. A current feedback resistor 454 is attached to the ground side of the auxiliary active material element 444 and the main active material element 420.

The mechanical system 10, 110, 210, 310, 410 may be used with actuators 12, 112, 212, 312, 412 in automotive vehicles, for example, seat adjustment actuators, vehicle locking actuators, window opening and closing actuators, etc.

While the best modes for carrying out the invention have been described in detail, those familiar with the art to which this invention relates will recognize various alternative designs and embodiments for practicing the invention within the scope of the appended claims.

The invention claimed is:

1. A method for priming an actuator for imparting a desired motion to a load in a mechanical system, the method comprising:
    applying a gradually increasing first stimulus to an active material element of the actuator to vary a variable property until a priming device detects the onset of actuation for the actuator;
    determining a priming stimulus level based on the first stimulus at the onset of actuation of the actuator; and
    applying a second stimulus to the active material element of the actuator to vary the variable property until a motive force of the actuator is achieved, to thereby impart the desired motion to the load;
    wherein the load is moved from a first position to a second position during the determination of the appropriate priming stimulus level, wherein the system is maintained in the state corresponding to the actuator being primed until the actuator is moved to one of the third state and the first state; and
    wherein the load is moved to a third position during actuation of the actuator.

2. The method of claim 1, wherein the applying the priming stimulus is in response to a first activation signal generated by the controller, and wherein the applying the second stimulus is in response to a second activation signal generated by the controller.

3. The method of claim 1 wherein the onset of actuation for the active material actuator is determined based on the deflection of the actuator through a pre-determined distance.

4. The method of claim 1, wherein the applying the first stimulus continues until one of; the second activation signal, a predetermined amount of time has passed, a predetermined temperature of the active material element is reached; the controller aborts the operation due to a sensed pre-defined condition; and the controller aborts the operation due to an algorithmically inferred pre-defined condition.

5. The method of claim 1 wherein the determining the priming stimulus level further comprises applying a stimulus applied to an auxiliary system which includes an active material element and a load that are operatively connected to the active material element in the actuator and the system load such that the priming stimulus level for the actuator is determined from a change in state of the auxiliary system.

6. The method of claim 1, wherein the applying the first stimulus to the active material element includes applying the first stimulus proportionally to a priming device.

7. The method of claim 4, further comprising ceasing to provide the first stimulus to the priming device prior to applying the second stimulus to the active material element.

8. A mechanical system for selectively moving a load a motive distance, the mechanical system comprising:
    an actuator operable for applying a force to the load, the actuator including a first active material element having a variable property;
    a controller connected to the actuator and operable for determining a priming stimulus level to shift the actuator from a first state to a second state associated with detecting the onset of actuation for the actuator;
    wherein the controller is operable to send the priming stimulus level to the actuator to shift it to the primed state;
    wherein the controller is operable for sending a second stimulus to the actuator to shift the actuator to a third state, such that the actuator is applying the force to the load to move the load the motive distance;
    wherein the actuator includes a priming device operable for determining the onset of actuation of the first active material element; and
    wherein a first end of the first active material element is connected to an output load, a second opposing end of the first active material element is anchored to a structural support, and a priming spring is connected to the first active material element in a bow-string arrangement therebetween.

9. The mechanical system of claim 8, wherein the priming device includes an element to detect one of force on of the active material element and displacement of the active material element.

10. The mechanical system of claim 8, wherein the load is in a first position when the actuator is in the first state, in a second position when the actuator is in a second state, and in a third position when the actuator is in the third state; and wherein the distance between the first position and the second position is the same as the predetermined priming distance.

11. The mechanical system of claim 8, wherein the deflection of the first active material element to shift the actuator during the determination of the priming stimulus level is equal to a minimal portion of a total deflection of the first active material element to move the load the motive distance.

12. The mechanical system of claim 8, wherein the load is in the same position when the actuator is in the first state and when the actuator is in the second state.

13. The mechanical system of claim 8, wherein the priming device includes an auxiliary active material element.

14. The mechanical system of claim 13, wherein the priming device determines when the auxiliary active material element has deflected the priming distance to thereby determine that the first active material element has attained a stimulus level that estimates a suitable priming stimulus for the first active material element.

15. The mechanical system of claim 8, further comprising:
 a coupler having the load secured thereto;
 a spring attached to the coupler and the first active material element, such that the spring is arranged in series with the first active material element to allow movement of the first active material element relative to the coupler; and
 a locking device supported on the coupler, and wherein the locking device selectively prevents motion of the first active material element.

16. The mechanical system of claim 8, wherein the priming device includes an auxiliary device comprising:
 an auxiliary active material element having a variable property;
 an auxiliary stationary element attached to a first end of the auxiliary active material element;
 an auxiliary coupler attached to a second opposing end of the auxiliary active material element;
 an auxiliary load attached to the coupler; and
 wherein the actuator is selectively electrically connected to the auxiliary device to selectively send a proportional amount of the first stimulus to the auxiliary active material to deflect the auxiliary active material element.

17. The mechanical system of claim 16, wherein the proportional amount of the first stimulus sent to the auxiliary active material element is equal to the first stimulus sent to the first active material element during the determination of the priming stimulus level for the first active material element.

18. The mechanical system of claim 8, wherein the controller determines the priming stimulus level appropriate for the actuator and maintains the actuator in the primed state in response to a first stimulus; wherein the controller shifts the actuator from the primed state to the third state in response to a second stimulus; wherein the controller shifts the actuator from the primed state to the first state when one of a second stimulus is not received within a specified interval of time and an error condition is detected; and wherein the controller shifts the actuator to the first state when one of a third stimulus is received and neither of the first or second stimuli are received.

* * * * *